3,281,448
CHLORINATION OF PHENYLENE DIISOCYANATE
John F. Start, Hamilton Township, N.J., assignor to FMC Corporation, New York, N.Y., a corporation of Delaware
No Drawing. Filed May 17, 1963, Ser. No. 281,330
4 Claims. (Cl. 260—453)

This invention relates to the chlorination of phenylene diisocyanate, and more particularly, to the chlorination of phenylene diisocyanate in the presence of a ferric chloride catalyst and a novel promoter therefor.

Aromatic polyisocyanates have found considerable use in recent years as intermediates in the preparation of rigid and flexible foams, coatings and abrasion-resistant rubber substitutes. These products are generally prepared by reacting a high molecular weight polyol with an aromatic polyisocyanate, thereby forming a polyurethane composition. In certain of these applications it is advantageous to use an aromatic diisocyanate which contains chlorine on the aromatic nucleus. These chlorinated diisocyanates are more reactive with high molecular weight polyols than the corresponding unsubstituted diisocyanate, and they are particularly useful in the preparation of flame-retardant polyurethane compositions.

In Patent No. 2,915,545, J. J. Tazuma describes a method of chlorinating phenylene diisocyanate by reacting chlorine with a melt of phenylene diisocyanate using anhydrous ferric chloride as the catalyst. The examples in this patent indicate that about 13 hours are required for the chlorination of phenylene diisocyanate to trichloro- and tetrachlorophenylene diisocyanate in the presence of ferric chloride.

It is an object of this invention to provide an improved process of preparing highly chlorinated phenylene diisocyanate in a substantially reduced reaction time. It is another object to provide an improved process of preparing highly chlorinated phenylene diisocyanate using a novel chlorination catalyst. Still another object is to provide an improved process of preparing highly chlorinated phenylene diisocyanate by chlorination in the presence of a promoted ferric chloride catalyst. These and other objects will become apparent from the following description of this invention.

I have now discovered that the reaction time required for preparing highly chlorinated phenylene diisocyanate by the chlorination of phenylene diisocyanate or partially chlorinated phenylene diisocyanate in the presence of ferric chloride can be substantially reduced by conducting the reaction in the further presence of sulfur monochloride. I have found that by the use of sulfur monochloride as a promoter, phenylene diisocyanate can be converted to trichlorophenylene and tetrachlorophenylene diisocyanate in markedly reduced reaction times.

Chlorinated phenylene diisocyanate is prepared by the reaction of phenylene diisocyanate and chlorine at elevated temperatures. The chlorination reaction proceeds stepwise and thus can be terminated to form a product containing predominately monochloro-, dichloro-, trichloro-, or tetrachlorophenylene diisocyanate, or adjacent mixtures thereof. When the chlorination is carried out in the absence of catalyst, the reaction generally ceases at the dichlorophenylene diisocyanate stage. By the use of a catalyst such as ferric chloride, the reaction proceeds quite rapidly to the dichloro stage and then continues at a somewhat slower rate through trichlorophenylene diisocyanate to complete chlorine substitution, that is, tetrachlorophenylene diisocyanate.

I have found that when employing the novel catalyst promoter disclosed herein, the reaction proceeds extremely rapidly through the formation of trichlorophenylene diisocyanate and then slows down only for the substitution of the last chlorine atom. Furthermore, the overall rate of reaction through the various chlorination stages is increased.

The starting material for the improved reaction disclosed herein may be either meta- or para-phenylene diisocyanate. The reaction is also particularly applicable to the chlorination of partially chlorinated phenylene diisocyanate. For example, it may be desirable to partially chlorinate phenylene diisocyanate to the monchloro- or dichloro-stage and then use the promoted catalyst of this invention for preparing trichloro- and tetrachlorophenylene diisocyanate.

In accordance with this invention, the chlorination of phenylene diisocyanate in the presence of ferric chloride is promoted by the further presence of sulfur monochloride. Although I have found that the catalyst is promoted only when sulfur monochloride is present, the exact chemical composition of the catalyst promoter is not certain. For example, the reaction is promoted by charging elemental sulfur, sulfur monochloride, sulfur dichloride or sulfur tetrachloride. When elemental sulfur is added to the reaction, it is quickly chlorinated to sulfur monochloride. When sulfur dichloride or sulfur tetrachloride is added to the reaction, it is converted at the reaction temperature to the more stable sulfur monochloride. Although sulfur monochloride is the primary form in which the sulfur exists during the reaction, each of the other sulfur chlorides is also present to some extent, and it is not certain which one is the actual catalyst promoter. It is also possible that the truly catalytic ingredient is a complex of ferric chloride and sulfur tetrachloride such as $FeSCl_7$. In any event, the catalyst promotion of this invention is obtained when conducting the reaction in the presence of sulfur monochloride.

The chlorination of phenylene diisocyanate and partially chlorinated derivatives thereof is carried out by bubbling chlorine gas through melted starting material. The rate at which chlorine is absorbed by the medium will be controlled by the reaction temperature and pressure and the rate at which chlorine is charged. It is preferred that chlorine be added at substantially the rate at which it is absorbed by the medium, although a faster or slower rate of chlorine addition may be utilized, if desired.

The improved process of this invention can be conducted under essentially the same conditions as have been utilized heretofore in the preparation of highly chlorinated phenylene diisocyanate by chlorination in the presence of ferric chloride. The reaction can be carried out over a wide range of temperatures varying from the melting point of the starting material to about 200° C. Initiation temperatures as low as about 50° C. have been employed. Preferably, the reaction is conducted at temperatures of about 55–140° C. Temperatures above about 200° C. should be avoided since they favor the formation of undesirable side-products.

The chlorination reaction can be carried out at atmospheric pressure or pressures above atmospheric. Since the rate of chlorination is essentially regulated by the rate at which chlorine is absorbed by the liquid medium, the use of elevated pressures increases the reaction rate. However, such elevated pressures are not generally necessary since the reaction is quite fast, even at atmospheric pressure.

The reaction time required to conduct the improved reaction taught herein will depend upon the temperature, pressure, rate of chlorine addition, and the amount of catalyst and promoter present. Generally, reaction times of about 2–5 hours are encountered.

The reaction is catalyzed by the presence of ferric chloride which in turn is promoted by the presence of sulfur monochloride. Commercially available anhydrous ferric chloride is suitable as the catalyst. This catalyst is quite sensitive and quickly becomes deactivated during the chlorination reaction. It is advantageous, therefore, to add the catalyst and its promoter incrementally during the reaction, rather than all at once at the beginning. It is also advantageous to conduct the reaction as quickly as possible since the deactivation of the catalyst seems to be time regulated. This effect is particularly exemplified by the fact that if ferric chloride and sulfur monochloride are mixed with the starting material, but not reacted immediately, the activity of the catalyst and promoter becomes degraded in proportion to the length of time it was allowed to remain in contact with the starting material. It is suspected that the starting material may contain trace amounts of a catalyst poison.

I have found that best results are obtained when the catalyst and its promoter are formed in situ during the chlorination reaction. The reaction is preferably conducted by charging iron powder and elemental sulfur to the reactor, whereby fresh catalyst and promoter are continually generated over the period of time in which the reaction is taking place. By operating in this manner the effect of catalyst poisons is minimized.

The ferric chloride catalyst should be present in a catalytic amount which may vary from about 0.1–3%, based upon the starting material. I have observed that the addition of as little as 0.078% of iron powder gives a quite noticeable catalytic effect. Preferably, the reaction is conducted by the addition of about 0.1–0.5% of iron powder. Larger amounts of iron powder such as about 1% may be used, if desired; however, more than this amount tends to limit the yield, apparently due to the formation of a complex between the catalyst, promoter, and reaction product.

The reaction should be carried out in the presence of a promotional amount of sulfur monochloride which may vary from about 0.5–10%, based upon the starting material. Preferably, the reaction is conducted by charging 1–3% of elemental sulfur to the reaction medium. The presence of very small amounts of sulfur monochloride such as 0.5% have a noticeable effect upon the reaction. No further benefit is derived from the use of more than about 10% of sulfur monochloride, although no adverse effect results from the use of larger amounts.

The crude product obtained from the improved process of this invention is relatively pure. If desired, it can be distilled to separate substantially pure product from the minor amounts of catalyst, promoter and non-distillable complexes. Distilled chlorinated phenylene diisocyanate prepared in accordance with this invention has a light yellow color. Most of this color can be removed by the use of adsorbents such as acidic clays and carbon blacks.

The following examples, illustrating the improved process disclosed herein, are presented without any intention that the invention be limited thereto. All parts and percentages are by weight.

*Example 1*

To a cylindrical reactor of 700 ml. capacity were added 320 g. (2 moles) of freshly distilled m-phenylene diisocyanate, 6.4 g. (2%) of sulfur and 1.0 g. (0.31%) of iron powder. The reactor was warmed to 76° C. and chlorine was introduced from a warmed cylinder through a totally submerged fine glass sparger at the rate of 16 moles per hour. As the exotherm commenced, the reactor was immersed in a 20° C. water bath at a level sufficient to maintain the internal temperature at 120–130° C. Samples of the reaction mass were withdrawn at 10–15 min. intervals and analyzed by gas chromatography. After 50 min. the exotherm ceased, and the reactor was immersed in a 130° C. oil bath at a level sufficient to maintain the internal temperature at 120–125° C. After a total reaction time of 2 hrs., the chlorine flow was stopped, and the reactor was removed from the bath, cooled to 70° C., disconnected from the system and weighed. There was obtained 590.0 g. of crude product, which was analyzed by gas chromatography and found to contain 90.6% tetrachlorophenylene diisocyanate, 6.7% trichlorophenylene diisocyanate and 2.7% lesser chlorinated volatiles. Distillation of the crude (1 theoretical plate) yielded 26.5 g. (4.5%) of material, B.P. 133–142° C./3 mm. Hg; 534.5 g. (91%) of material, B.P. 142–159° C./3 mm. Hg, gas chromatographic assay 92.4% tetrachlorophenylene diisocyanate and 7.2% trichlorophenylene diisocyanate; 20.6 g. (3.51%) of residue in the pot; and 3.9 g. (.66%) of product hang-up in the glassware. The material balance was 99.2%, the conversion of phenylene diisocyanate to tetrachlorophenylene diisocyanate was 90%, and the corrected yield was 96.5%.

Gas chromatographic analysis of the samples withdrawn during the reaction indicated the following reaction rate:

| Reaction time, minutes: | Chlorine substitution, gram atoms per mole |
|---|---|
| 34 | 2.82 |
| 50 | 3.21 |
| 65 | 3.35 |
| 80 | 3.62 |
| 95 | 3.79 |
| 120 | 3.91 |

*Example 2*

To a cylindrical reactor of 300 ml. capacity and equipped with a manometer set to release pressure in excess of 24 in. of water was charged 160 g. (1 mole) of molten m-phenylene diisocyanate. The reactor was then immersed in a one-gallon glycerine bath maintained at 82° C. and 0.24 g. (0.15%) of iron powder and 3.2 g. (2%) of sulfur were added to the molten feed. Chlorine was charged at the rate of 1.25 moles per mole of phenylene diisocyanate per hour. The reaction was maintained by heating to 135° C. for a total reaction time of 3.3 hours. The reaction product was analyzed by gas chromatography and found to contain 3.84 gram atoms of chlorine per mole of phenylene diisocyanate.

*Example 3*

In a manner similar to Example 2, m-phenylene diisocyanate was chlorinated with the addition of 1.6 g. (1%) of sulfur and 0.32 g. (0.5%) of ferric chloride. The reaction was conducted at temperatures of 90–148° C. over a 5-hour period. Gas chromatography indicated that the product contained 3.65 gram atoms of chlorine per mole of phenylene diisocyanate.

*Example 4*

In a manner similar to Example 2, m-phenylene diisocyanate was chlorinated with the addition of 0.24 g. (0.15%) of ferric chloride and 6.7 g. (4.2%) of sulfur monochloride. The reaction was conducted at temperatures of 91–130° C. over a period of 3.7 hours. Gas chromatography indicated that the product contained 3.8 gram atoms of chlorine per mole of phenylene diisocyanate.

*Example 5*

In a manner similar to Example 2, p-phenylene diisocyanate was chlorinated with the addition of 3.2 g. (2%) of sulfur and .48 g. (0.3%) of iron powder. The reaction was conducted at temperatures of 90–158° C. for a period of 3.8 hrs. Gas chromatography indicated that the product contained 3.9 gram atoms of chlorine per mole of phenylene diisocyanate.

*Example 6*

To a cylindrical reactor of 3-liter capacity were charged 1,910 g. (12 moles) of m-phenylene diisocyanate, 38.4 g. (2.0%) of sulfur, and 6 g. (0.31%) of iron powder.

The reaction medium was heated to 57° C. and chlorine was introduced through two fine glass spargers at the rate of 18 moles per hour. After a total of 260 min., the reaction was stopped and 3,105 g. of crude product were recovered. Gas chromatography indicated that the product contained 8.0% dichloro-, 85.3% trichloro-, and 5.97% tetrachlorophenylene diisocyanate which is equivalent to 2.89 gram atoms of chlorine per mole of phenylene diisocyanate. Distillation of the crude yielded 32.5 g. (1%) of material, B.P. 76–154° C./7 mm. Hg, gas chromatographic assay 3.1% monochloro-, 30% dichloro-, 66.3% trichloro-, and 0.4% tetrachlorophenylene diisocyanate; 2,234 g. (71%) of material B.P. 154–165° C./7 mm. Hg, gas chromatographic assay 20.2% dichloro-, 76.4% trichloro-, and 3.3% tetrachlorophenylene diisocyanate; 498 g. (15.8%) of material, B.P. 162–172° C./6.5 mm. Hg, gas chromatographic assay 1.4% dichloro-, 81.4% trichloro-, and 17.2% tetrachlorophenylene diisocyanate; and 312.0 g. (9.93%) of residue. The material balance was 97.8%, and the yield of dichloro- and trichlorophenylene diisocyanate in the distillate was 89%.

As will be apparent to those skilled in the art, numerous modifications and variations of the embodiments illustrated above may be made without departing from the spirit of the invention or the scope of the following claims.

I claim:
1. In the process of preparing a chlorinated phenylene diisocyanate selected from the group consisting of trichlorophenylene diisocyanate, tetrachlorophenylene diisocyanate, and mixtures thereof by reacting chlorine at a temperature of 50° to 200° C. with a member of the group consisting of phenylene diisocyanate and partially chlorinated phenylene diisocyanate in the presence of a catalytic amount of ferric chloride, the improvement which comprises conducting the reaction in the further presence of sulfur monochloride as a promoter for the ferric chloride.

2. The process of claim 1 in which phenylene diisocyanate is m-phenylene diisocyanate.

3. The process of preparing a chlorinated phenylene diisocyanate selected from the group consisting of trichlorophenylene diisocyanate, tetrachlorophenylene diisocyanate, and mixtures thereof which comprises reacting chlorine with a member of the group consisting of phenylene diisocyanate, monochlorophenylene diisocyanate, dichlorophenylene diisocyanate, and mixtures thereof at a temperature of 55–140° C. and charging 0.1–0.5% of iron powder and 1–3% of elemental sulfur to the reaction.

4. The process of claim 3 in which phenylene diisocyanate is m-phenylene diisocyanate.

References Cited by the Examiner

UNITED STATES PATENTS

| | | | |
|---|---|---|---|
| 1,741,305 | 12/1929 | Jaeger | 260—694 X |
| 1,846,727 | 2/1932 | Jaeger | 260—694 |
| 1,868,608 | 7/1932 | Kunz et al. | 260—453 X |
| 2,443,385 | 6/1948 | Hardman | 260—694 |
| 2,915,545 | 12/1959 | Tazuma | 260—453 |

CHARLES B. PARKER, *Primary Examiner.*

DALE R. MAHANAND, *Assistant Examiner.*